(12) United States Patent
Blanchard et al.

(10) Patent No.: US 8,282,355 B2
(45) Date of Patent: Oct. 9, 2012

(54) TURBOMACHINE ROTOR WHEEL HAVING COMPOSITE MATERIAL BLADES

(75) Inventors: Stephane Pierre Guillaume Blanchard, Chartrettes (FR); Stephane Otin, Paris (FR); Guillaume Jean-Claude Robert Renon, Vaux le Penil (FR)

(73) Assignee: SNECMA, Paris (FR)

( * ) Notice: Subject to any disclaimer, the term of this patent is extended or adjusted under 35 U.S.C. 154(b) by 414 days.

(21) Appl. No.: 12/646,454

(22) Filed: Dec. 23, 2009

(65) Prior Publication Data

US 2010/0166560 A1    Jul. 1, 2010

(30) Foreign Application Priority Data

Dec. 23, 2008 (FR) ..................................... 08 58997

(51) Int. Cl.
F01D 5/02 (2006.01)
(52) U.S. Cl. ..................................... 416/214 A; 416/218
(58) Field of Classification Search ............... 416/214 A, 416/215, 218; 29/889.21
See application file for complete search history.

(56) References Cited

U.S. PATENT DOCUMENTS

| 955,648 | A | * | 4/1910 | Knight | ........................... | 416/215 |
| 1,876,067 | A | | 9/1932 | Lorenzen | | |
| 5,263,823 | A | * | 11/1993 | Cabaret et al. | ................. | 416/218 |
| 5,580,217 | A | * | 12/1996 | Richards et al. | ........... | 416/193 A |

FOREIGN PATENT DOCUMENTS

| DE | 165 854 | 10/1904 |
| DE | 439 567 | 1/1927 |
| EP | 0 524 876 A1 | 1/1993 |
| FR | 389 268 | 9/1908 |
| GB | 9278 | 0/1909 |

OTHER PUBLICATIONS

U.S. Appl. No. 13/141,857, filed Jun. 23, 2011, Blanchard, et al.
U.S. Appl. No. 12/636,041, filed Dec. 11, 2009, Blanchard, et al.

* cited by examiner

Primary Examiner — Richard Edgar
(74) Attorney, Agent, or Firm — Oblon, Spivak, McClelland, Maier & Neustadt, L.L.P.

(57) ABSTRACT

A turbomachine rotor wheel having composite material blades is disclosed. The wheel includes a slideway disk having a circumferential groove at its outer periphery, the groove having an opening that is narrower than its bottom, with a plurality of composite material blades each having a blade root engaged in the groove of the slideway disk and presenting a longitudinal section adapted to the longitudinal section of the slideway disk in order to be held radially therein by co-operating shapes, and an orientation disk fastened coaxially around the slideway disk and including, in its outer periphery, a plurality of axial slots each of which is open at one end. Each slot presents a cross-section that is adapted to the cross-section of a corresponding blade root so as to hold it angularly by co-operating shapes.

9 Claims, 4 Drawing Sheets

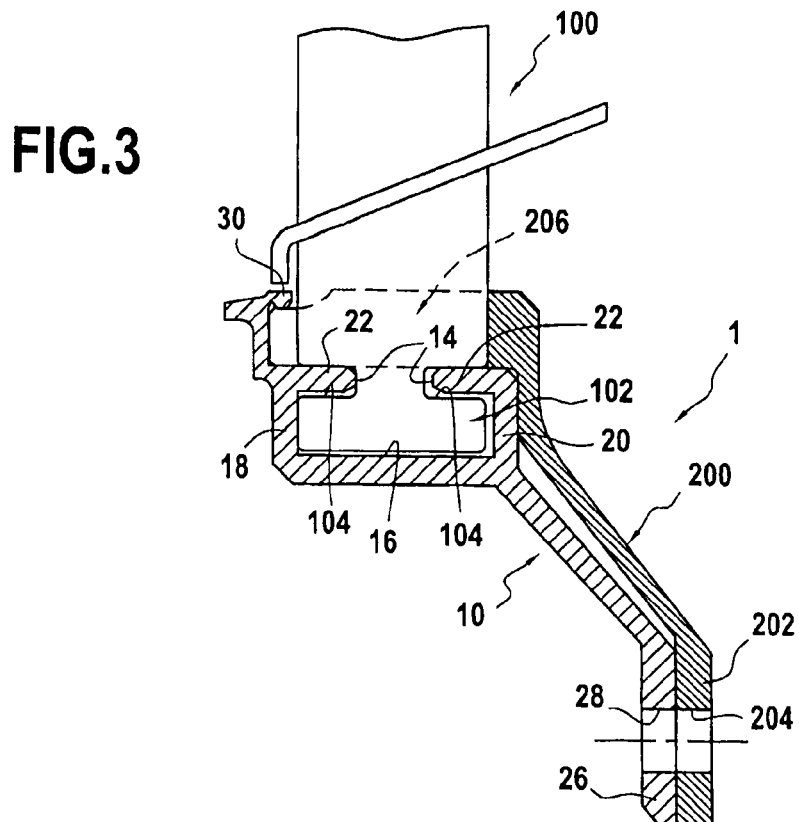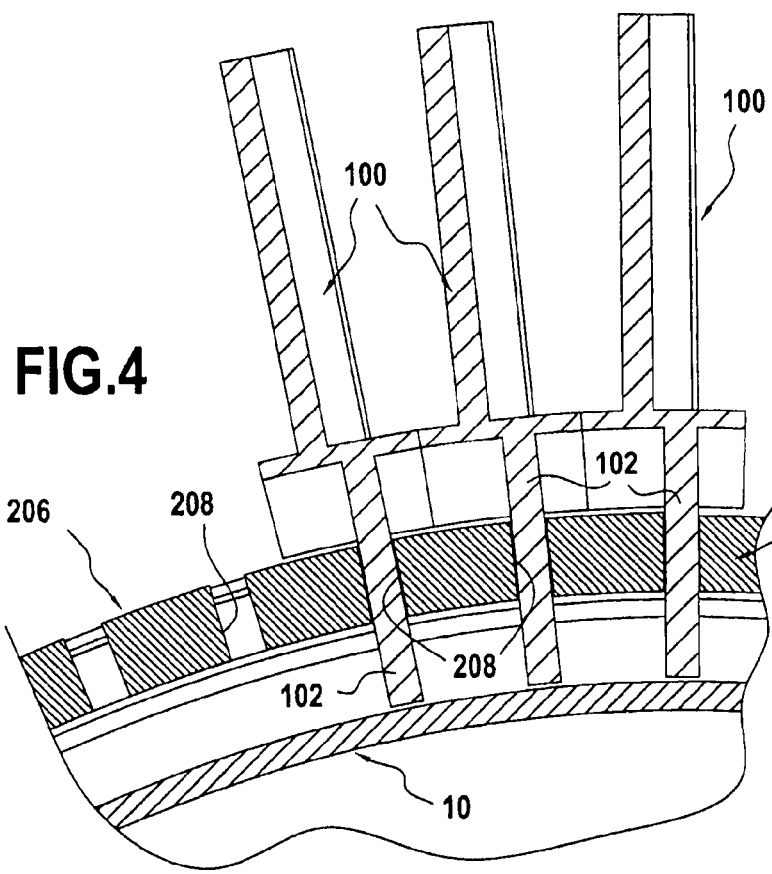

TURBOMACHINE ROTOR WHEEL HAVING COMPOSITE MATERIAL BLADES

BACKGROUND OF THE INVENTION

The present invention relates to the general field of turbomachine blades of composite material comprising fiber reinforcement densified by a matrix.

The target domain is that of bladed rotor wheels for aviation engines or for industrial turbines.

Proposals have already been made to make turbomachine blades out of composite material. By way of example, reference may be made to patent application FR 08/58090 (not yet published) filed jointly in the names of Snecma and Snecma Propulsion Solide, which application describes fabricating a turbomachine blade by making a fiber preform by three-dimensional weaving and then densifying the preform with a matrix.

Compared with a metal blade obtained in a foundry, a composite material blade presents certain drawbacks associated in particular with mounting it on a rotor disk that is made of metal. It is known that the metal of the disk and the composite material of the blades present thermal expansion coefficients that are very different, thereby manifestly giving rise to problems of fitting the blade roots on the disk while the blades are being mounted.

OBJECT AND SUMMARY OF THE INVENTION

The present invention thus has a main object of mitigating such drawbacks by presenting a turbomachine rotor wheel with composite material blades, characterized in that it comprises:

a slideway disk having at its outer periphery a circumferential groove presenting an opening that is narrower than its bottom;

a plurality of blades of composite material, each blade having a blade root engaged in the groove of the slideway disk and presenting a longitudinal section that is adapted to the longitudinal section of the groove of the slideway disk so as to be held radially therein by co-operating shapes; and an orientation disk having at its outer periphery a substantially longitudinal portion with a plurality of axial slots, each open at one end and each presenting a cross-section matching the cross-section of a blade root so as to hold the root angularly by co-operating shapes.

The composite material blades are assembled on the wheel as follows. The blades are initially inserted one after another by engaging their roots in the groove of the slideway disk. The orientation disk is then mounted around the slideway disk so that each blade root is engaged in a slot of the orientation disk. The orientation disk is then fastened to the slideway disk. The rotor wheel of the invention thus enables composite material blades to be mounted effectively on a rotor disk made of metal. This assembly makes it possible in particular to control problems associated with expansion differences between the composite material constituting the blades and the metal of the wheel disks.

The groove of the slideway disk may include, at an axial end, a side wall connecting its bottom to its opening. Under such circumstances, each blade root preferably includes an axial notch co-operating with a rim of the side wall of the groove of the slideway disk.

The wheel may also include a positioning ring connecting the bottom of the groove of the slideway disk to its opening at the other axial end of the groove. Under such circumstances, each blade root preferably includes another axial notch co-operating with a rim of the positioning ring.

Alternatively, the groove of the slideway disk may include, at each axial end, a respective side wall connecting its bottom to its opening. Under such circumstances, each blade root preferably has two axial notches each co-operating with a rim of a respective side wall of the groove of the slideway disk.

Preferably, the wheel further includes means for holding the orientation disk radially around the slideway disk.

The invention also provides a turbomachine including at least one rotor wheel as defined above.

BRIEF DESCRIPTION OF THE DRAWINGS

Other characteristics and advantages of the present invention appear from the following description made with reference to the accompanying drawings that show embodiments having no limiting character. In the figures:

FIGS. 3 and 4 are views of the FIG. 2 wheel respectively in longitudinal section and in cross-section;

DETAILED DESCRIPTION OF EMBODIMENTS

Figure 1:
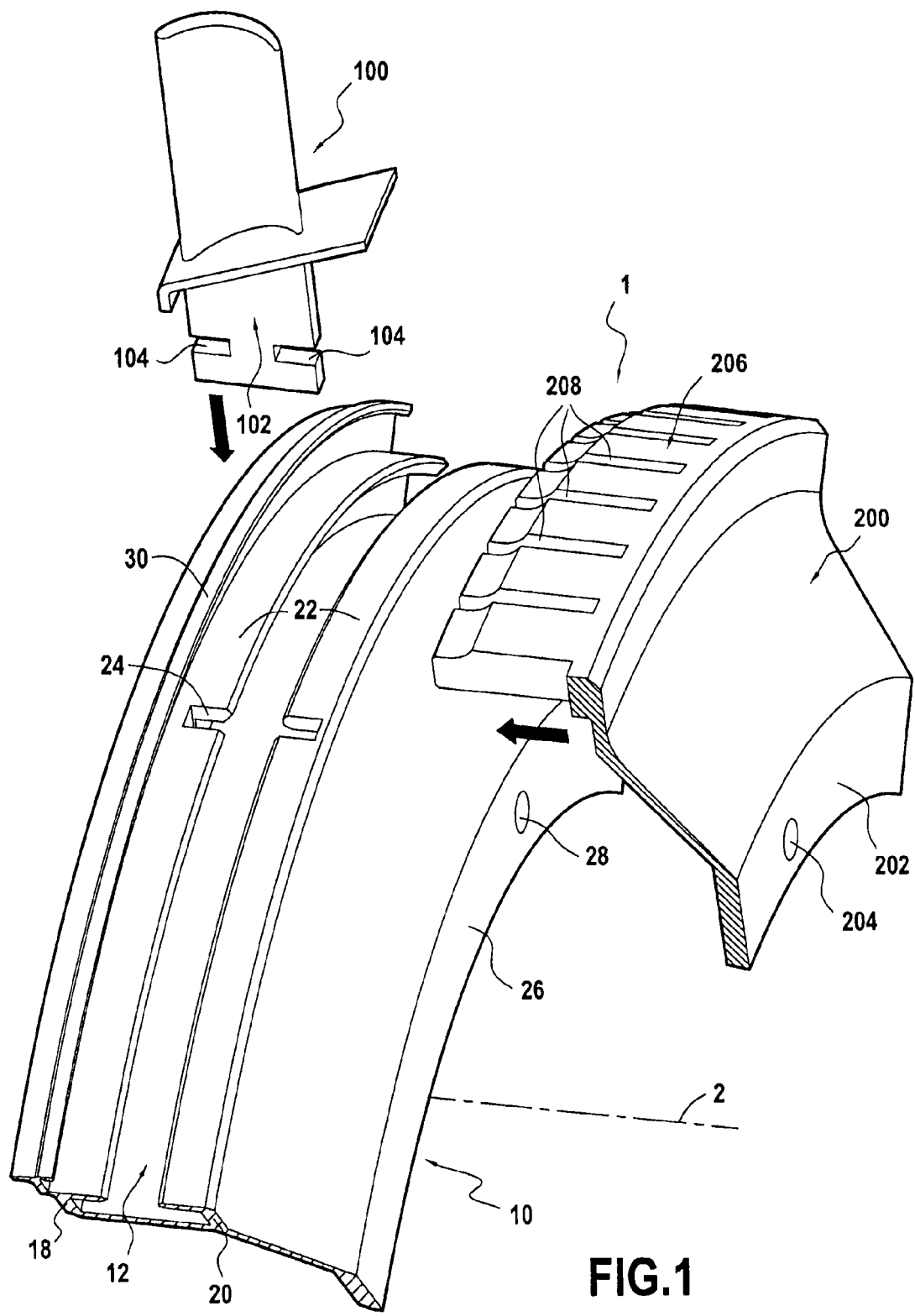
FIG. 1 is a fragmentary and exploded perspective view of a rotor wheel in a first embodiment of the invention.
Figure 2:
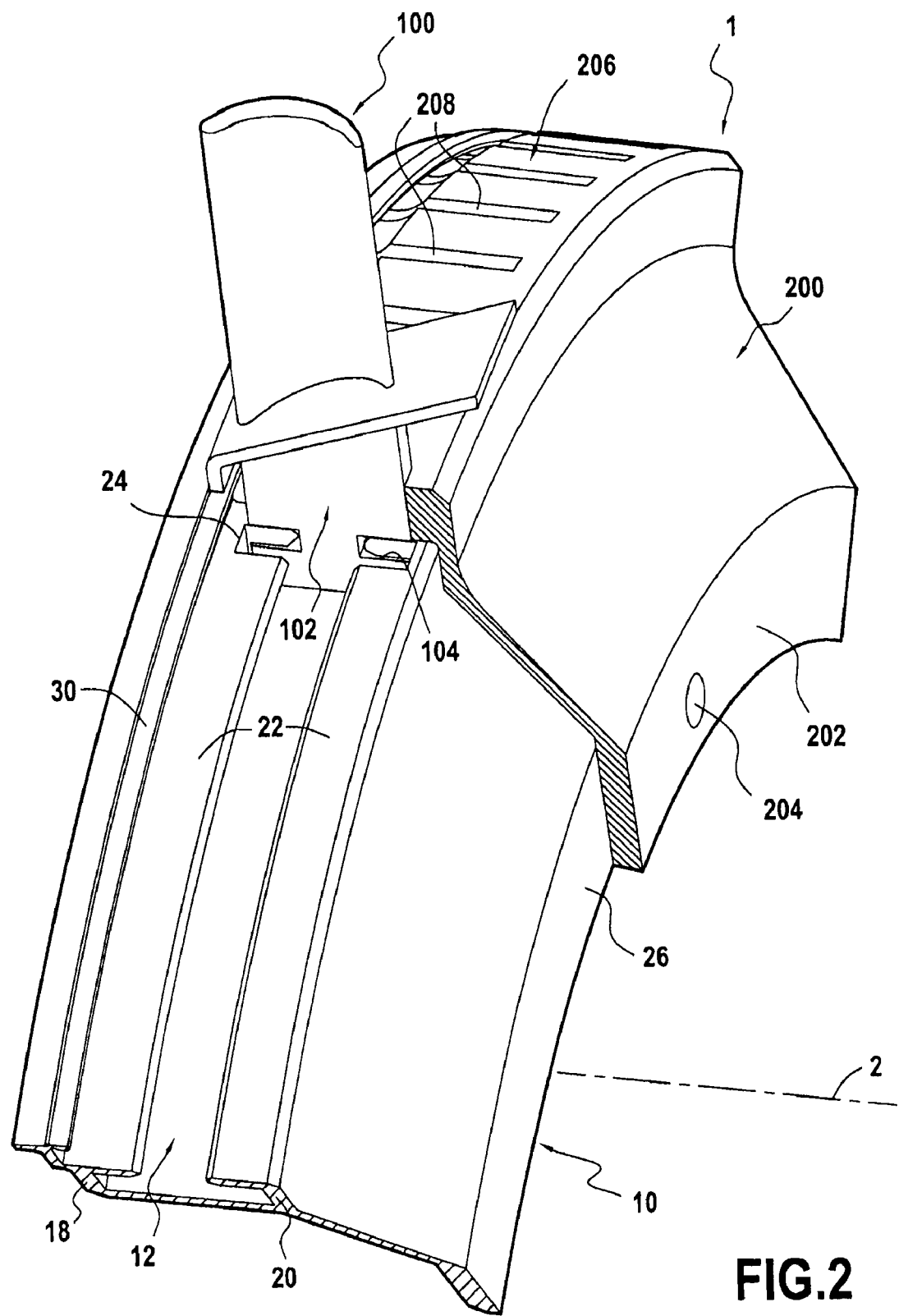
FIG. 2 is a view of the FIG. 1 wheel once assembled.

The invention is applicable to various types of turbomachine rotor wheel fitted with composite material blades, in particular compressor and turbine rotor wheels of various gas turbine spools, for example a low pressure turbine rotor wheel of an aviation turbomachine, such as that shown in FIGS. 1 to 4.

In the description below, the terms "upstream" and "downstream" are defined relative to the flow direction of the gas stream passing through the low pressure turbine.

The rotor wheel 1 shown in FIGS. 1 to 4 comprises in particular a metal slideway disk 10 that is centered on the axis 2 of rotation of the wheel.

In known manner for mounting blades with hammer-head fastening, the metal slideway disk 10 has a circumferential groove 12 at its outer periphery, with the opening 14 of the groove being narrower than its bottom 16.

More precisely, the groove 12 of the slideway disk includes, at its upstream axial end, an upstream side wall 18 and, at its downstream axial end, a downstream side wall 20, with these two side walls 18 and 20 connecting the bottom 16 to the opening 14 of the groove.

The rotor wheel 1 also has a plurality of blades 100 of composite material, each blade having a blade root 102 that is engaged in the groove 12 of the slideway disk 10.

Each blade is made of composite material using methods known to the person skilled in the art. By way of example, reference may be made to patent application FR 08/58090 that describes the fabrication of such a blade comprising fiber reinforcement obtained by three-dimensional weaving of yarns, which reinforcement is densified by a matrix.

Each blade root 102 has two axial notches 104 co-operating with corresponding rims 22 of the side walls 18 and 20 of the groove 12 of the slideway disk. Thus, as shown in particular in FIG. 3, each blade root 102 presents in longitudinal section (i.e. in section on a radial plane containing the axis 2 of rotation of the wheel), a section that matches the longitudinal section of the groove 12 of the slideway disk. As a result, the blades 100 can be held radially on the slideway disk by co-operating shapes.

The notches 104 formed in the blade roots 102 are added during the blade fabrication process, either by using inserts of corresponding shapes while weaving the blade, or by machining the root after first infiltration.

The blades 100 are mounted (and can be removed) by moving their roots into (or out from) the groove 12 of the slideway disk 10 via at least one blade insertion zone 24 that is formed in the rims 22 of the side walls 18, 20 of the slideway disk (FIG. 1). This blade insertion zone corresponds to widening the opening 14 of the groove 12 over an angular distance that is greater than the width of a blade root 102.

Alternatively, if the width of the blade root 102 relative to the width of the opening 14 of the groove makes this possible, the blades 100 could be mounted (and removed) into (or from) the groove of the slideway disk at any angular position therearound by turning the blade about its own main axis (so that the blade is presented width-wise to the groove). Under such circumstances, the presence of at least one blade insertion zone 24 as described above turns out still to be necessary, in order to mount the last blade.

The rotor wheel 1 also has a metal orientation disk 200 that is fastened coaxially around the slideway disk 10.

The orientation disk 200 is mounted more precisely around the downstream end of the slideway disk. At its inner periphery, it has a substantially radial attachment portion 202 that bears axially against a substantially radial attachment portion 26 of the slideway disk 10, these two attachment portions having respective holes 204, 28 for passing fastener systems (not shown in the figures), e.g. of the nut-and-bolt type.

In its outer periphery, the orientation disk 200 has a substantially longitudinal portion 206 provided with a plurality of axial slots 208 that are open at their upstream ends. In cross-section (i.e. in section on a radial plane perpendicular to the axis 12), each slot 208 is of section that matches the cross-section of a corresponding blade root 102 (see FIG. 4). As a result, the slots 208 of the orientation disk serve to hold each blade root in an angular position by co-operating shapes, i.e. it serves to prevent any blade root turning about its main axis.

The blades 100 are assembled on the rotor wheel 1 as follows. The blades 100 are initially inserted one after another by engaging their roots 102 in the groove 12 of the slideway disk 10. The orientation disk 200 is then mounted around the slideway disk in such a manner that each blade root 102 is engaged in a corresponding slot 208 of the orientation disk. The fastener systems are then inserted in the respective holes 204, 28 in the orientation disk and in the slideway disk so as to fasten the orientation disk on the slideway disk.

It should be observed that direct contact between the blade roots 102 made of composite material and the slots 208 in the metal orientation disk may be avoided by interposing fabric between these elements, e.g. fabric made of silicon (not shown).

Figure 5:
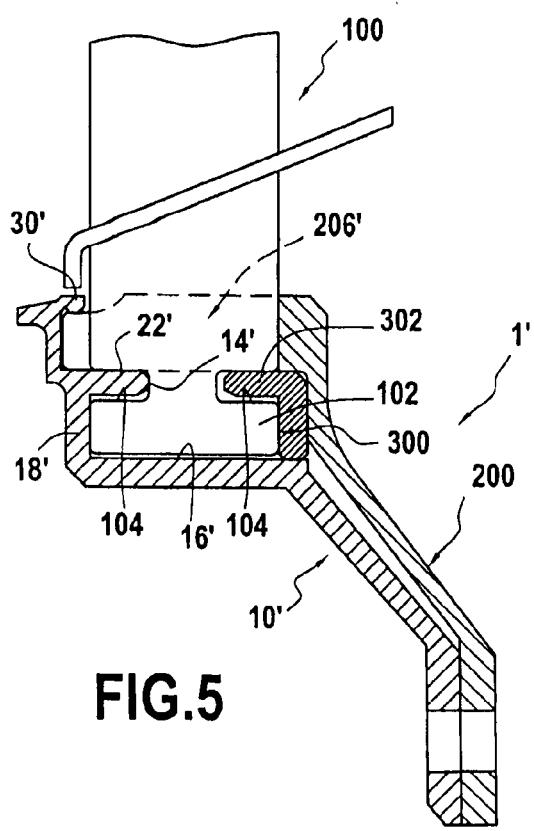
FIG. 5 is a longitudinal section of a rotor wheel of a second embodiment of the invention.

There follows a description with reference to FIG. 5 of a rotor wheel 1' in a second embodiment of the invention.

Compared with the first embodiment, the groove of the slideway disk 10' of the presently-described rotor wheel has only one side wall 18' connecting its bottom 16' to its opening 14', this side wall being formed at the upstream axial end of the groove. This side wall 18' includes in particular a rim 22' co-operating with a corresponding upstream axial notch 104 of each root 102 of the blades 100.

The rotor wheel 1' also includes a positioning ring 300 connecting the bottom 16' of the groove of the slideway disk 10' to its opening 14' at the other axial end of the groove (i.e. at its downstream axial end). This positioning ring 300 comprises in particular a rim-forming longitudinal portion 302 that serves to co-operate with the downstream axial notch 104 in each blade root 102.

The orientation disk 200 remains identical to that described with reference to the first embodiment.

Compared with the first embodiment, the rotor wheel 1' in this embodiment presents the advantage of lower fabrication cost since the slideway disk can be made by turning (and does not require notches to be made by cutters in order to make the groove).

Figure 6:
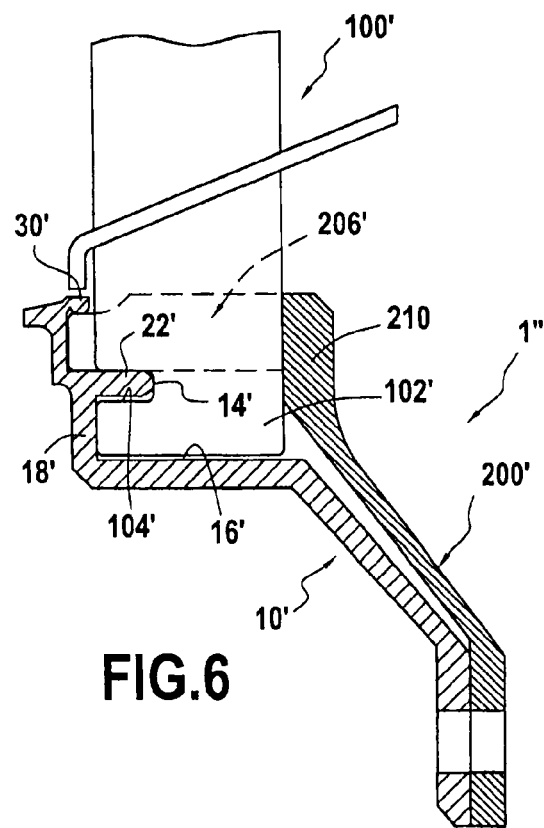
FIG. 6 is a longitudinal section view of a rotor wheel of a third embodiment of the invention.

With reference to FIG. 6, there follows a description of a rotor wheel 1" in a third embodiment of the invention.

Here, the slideway disk 10' of the rotor wheel 1" is identical to that described for the second embodiment, i.e. its groove has a single side wall 18' connecting its bottom 16' to its opening 14'. The downstream axial end of the groove in the slideway disk does not have a side wall such that the groove is open at its downstream end.

The orientation disk 200' presents a substantially radial holder portion 210 that extends the downstream end of its longitudinal portion 206' having the slots. This holder portion 210 thus forms an axial abutment for holding the blades 100' axially in the groove of the slideway disk.

Each blade 100' thus has only one axial notch 104' in the upstream end of its root 102'.

The rotor wheel 1" described with reference to this third embodiment also presents fabrication cost lower than that of the first embodiment (machining the slideway disk and fabricating the blades are made easier). In addition, the weight of the wheel is reduced, in particular because the weight of the slideway disk is reduced.

In an advantageous disposition of the invention that is common to all of the above-described embodiments, the rotor wheel 1, 1', 1" further includes means for holding the orientation disk radially around the slideway disk.

These means are implemented in the slideway disk 10, 10' that includes an annular shoulder 30, 30' formed to extend the upstream side wall 18, 18' of the groove in a radial direction. When the orientation disk 200, 200' is mounted around the slideway disk, the longitudinal portion 206, 206' of the orientation disk is received under said shoulder 30, 30' so as to hold the orientation disk radially.

The invention claimed is:

1. A turbomachine rotor wheel having composite material blades, comprising:
    a slideway disk having at its outer periphery a circumferential groove presenting an opening that is narrower than its bottom;
    a plurality of blades of composite material, each blade having a blade root engaged in the groove of the slideway disk and presenting a longitudinal section that is adapted to a longitudinal section of the groove of the slideway disk so as to be held radially therein by co-operating shapes, and a platform for defining a portion of an inner wall of a flow passage for a gas stream passing through the rotor wheel; and
    an orientation disk having at its outer periphery a substantially longitudinal portion with a plurality of axial slots, each open at one end and each presenting a cross-section matching a cross-section of a blade root so as to hold the root angularly by co-operating shapes, the orientation disk being mounted on the slideway disk so that its longitudinal portion is received radially between the blade platforms and the opening of the groove of the slideway disk.

2. The wheel according to claim 1, wherein the groove of the slideway disk includes, at an axial end, a side wall connecting its bottom to its opening.

3. The wheel according to claim 2, wherein each blade root includes an axial notch co-operating with a rim of the side wall of the groove of the slideway disk.

4. The wheel according to claim 2, further including a positioning ring connecting the bottom of the groove of the slideway disk to its opening at another axial end of the groove.

5. The wheel according to claim 4, wherein each blade root includes another an axial notch co-operating with a rim of the positioning ring.

6. The wheel according to claim 1, wherein the groove of the slideway disk includes, at each axial end, a respective side wall connecting its bottom to its opening.

7. The wheel according to claim 6, wherein each blade root has two axial notches, each co-operating with a rim of a respective side wall of the groove of the slideway disk.

8. The wheel according to claim 1, further including means for holding the orientation disk radially around the slideway disk.

9. A turbomachine including at least one rotor wheel according to claim 1.

* * * * *